Feb. 15, 1966   D. M. ANDERSON   3,234,965
COUPLING ASSEMBLY
Filed Sept. 17, 1962
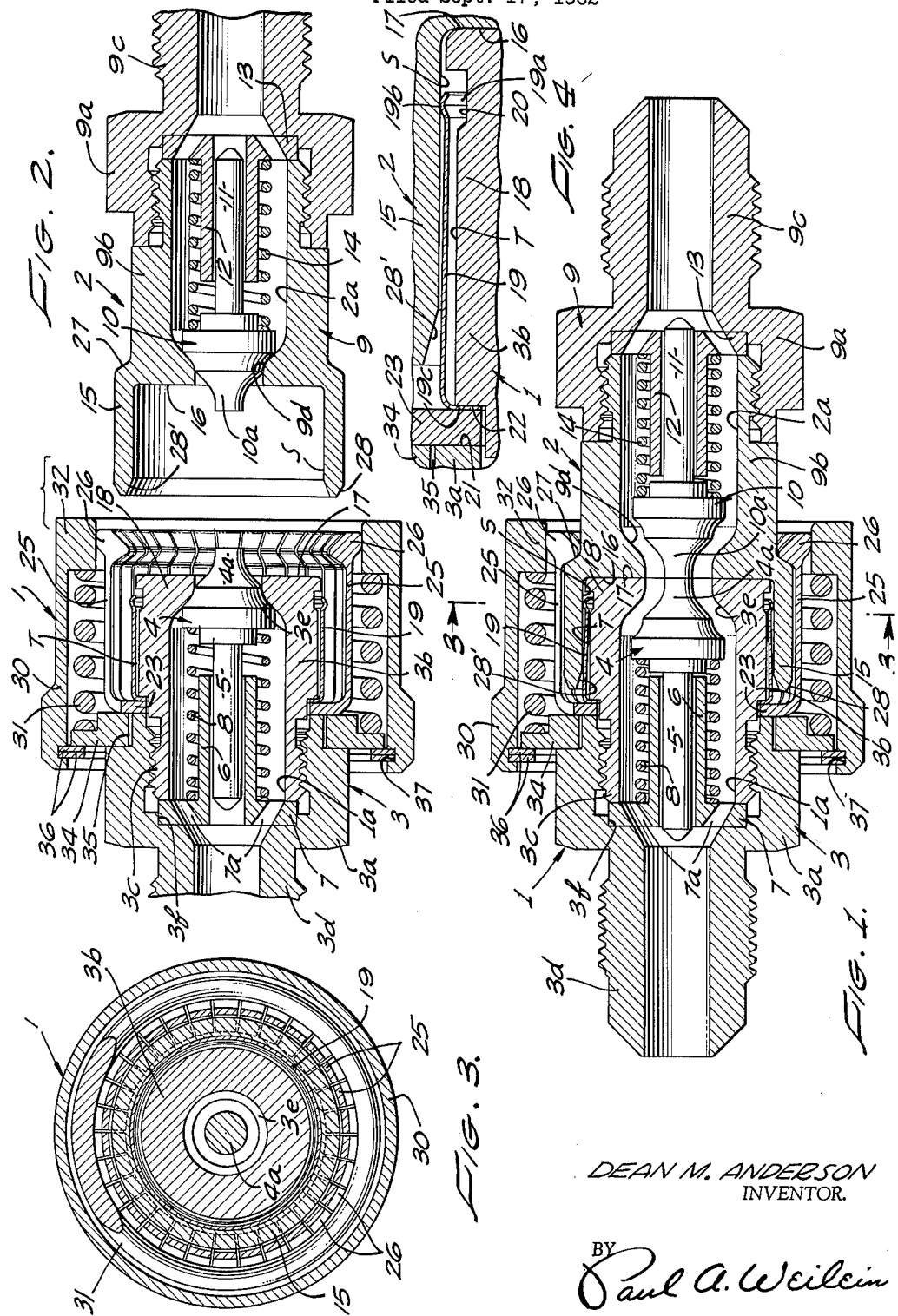
DEAN M. ANDERSON
INVENTOR.
BY Paul A. Weilein
ATTORNEY

United States Patent Office 3,234,965
Patented Feb. 15, 1966

3,234,965
COUPLING ASSEMBLY
Dean M. Anderson, Lakewood, Calif., assignor to E. B. Wiggins Oil Tool Company, Inc., Los Angeles, Calif., a corporation of California
Filed Sept. 17, 1962, Ser. No. 223,950
7 Claims. (Cl. 137—614.04)

This invention relates to an improved coupling for releasably connecting fluid lines or conduits.

It is an object of this invention to provide a coupling for fluid lines that is constructed and arranged in a novel manner making it possible advantageously to employ an equally novel resilient metal sealing means for maintaining a fluid tight seal preventing leakage at the coupling.

It is another object of this invention to provide a coupling such as above described wherein the metal sealing means is compatible to fluids which may cause damage or shorten the life of elastomer sealing elements and is not subject to impairment under temperature extremes which may ill effect elastomer seals nor subject to deterioration caused by long shelf life of the coupling.

It is another object of this invention to provide a coupling such as described in which mutually engageable coupling members and resilient metal sealing means are constructed and arranged in a novel manner so that tubular portions of the coupling members are disposed one within the other and provide circumferentially continuous opposed surfaces axially of the coupling members with the metal sealing means disposed to form a reliable fluid tight seal between such surfaces when the coupling members are coupled to one another.

It is another object hereof to provide a coupling such as next above described in which the metal sealing means is in the form of a circumferentially continuous resilient metal ring or band having considerable axial extent between opposed circumferentially continuous surfaces of the two coupling members when the latter are coupled, the band being secured to one of the coupling members so as to engage said opposed circumferential continuous surfaces of both members and provide an effective fluid tight seal when said coupling members are coupled as well as during the operation of coupling and uncoupling the coupling members.

Another object of the invention is to provide a quick action, self-locking and self-sealing coupling wherein novel locking means for releasably locking the mutually engageable coupling members in coupling relation and metal sealing means are correlated in a novel manner for securing the metal sealing means to one of the coupling members in the position for effecting a fluid tight seal and in which it is positively protected against being struck or damaged in the operation of coupling and uncoupling the coupling members as well as while the coupling members are separated or stored.

Another object of this invention is to provide a coupling of the character described in which the mutually engageable coupling members include spring loaded valves that are seated to shut off flow through the coupling members when the coupling members are uncoupled and are opened to permit flow through the coupling members incident to the coupling of the latter, the valves and the metal sealing means being so arranged that the latter will form a seal between the coupling members before the valves are unseated in the operation of coupling the coupling members as well as before the valves are seated during the uncoupling of the coupling members.

It is another object of this invention to provide an improved conduit coupling such as described wherein the resilient metal sealing band is urged by pressure of fluid in the coupling into position to form a fluid tight seal between the coupling members.

Other objects and advantages of the invention will be hereinafter described or will become apparent to those skilled in the art and the novel features of the invention will be defined in the appended claims.

Referring to the drawing:

FIG. 1 is a longitudinal sectional view of a coupling embodying mutually engageable coupling members and sealing means constructed and arranged in accordance with the present invention and shown in coupled position;

FIG. 2 is an exploded fragmentary sectional view of the coupling as when the coupling members are uncoupled;

FIG. 3 is a sectional view taken on the line 3—3 of FIG. 1; and

FIG. 4 is an enlarged fragmentary sectional view showing the manner in which the metal sealing means forms seals between portions of the coupling members.

The illustrative embodiment of a coupling constructed in accordance with this invention, as shown in the accompanying drawing, includes a pair of mutually engageable coupling members, namely a socket or female coupling member 1 and a nipple or male coupling member 2 adapted to be releasably coupled one to the other when connected with fluid lines or conduits, not shown, whereby fluid may flow through registering bores 1a and 2a extending axially through the respective coupling members.

The socket coupling member 1 as here shown, includes a sectional tubular body 3 formed of tubular sections 3a and 3b threadedly connected in a coaxial relation so as to define the bore 1a. The tubular section 3a at the end thereof connected to the tubular section 3b is internally screw threaded for a threaded connection with the reduced and screw threaded end 3c of the tubular section 3b. At its other end the tubular section 3a is provide with a tubular extension 3d which affords connection of the coupling member 1 with a fluid line or conduit, not shown.

A valve 4 is mounted in the bore 1a in the tubular section 3b so as to be movable into and out of engagement with a valve seat 3e formed adjacent one end of the bore 1a. A stem 5 on the valve 4 is slidably supported in a tubular valve guide 6 which has an annular integral flange 7 at one end. The peripheral portion of the flange 7 is engaged in an annular recess 3f formed internally of the tubular section 3a in surrounding relation to the bore therethrough. The reduced end 3c of the tubular section 3b abuts the flange 7 to hold it securely in place between the tubular sections 3a and 3b, there being a circular series of openings 7a in the flange 7 affording communication between the bore of the tubular extension 3d and the bore through the tubular section 3b. In this connection it should be noted that the guide 6 and flange 7 may be made of a suitable plastic material so that the flange will serve as a seal between the tubular section 3a and 3b.

A spring 8 confined on the guide 6 between the valve 4 and the flange 7 urges the valve against the annular seat 3e. When the valve 4 is seated a projection 4a located centrally of the outer face of the valve extends through the annular valve seat 3e and projects somewhat beyond the outer end of the tubular section 3b for a purpose to be hereinafter described.

The nipple or male coupling member 2 consists of a sectional tubular body 9 formed of tubular sections 9a and 9b threadedly connected in coaxial relation to define the bore 2a through the coupling member 2, there being a tubular extension 9c on the section 9a for connection with a fluid line or conduit not shown. The coupling member 2 is also provided with a valve 10, seat 9d, valve stem 11, stem guide 12, apertured flange 13 on guide 12 and spring 14 all constructed and arranged in the same manner as in the coupling member 1, there being a projection 10a on the valve 10 extending through the seat 9d in the same manner as the projection 4a on the valve 4 in the coupling member 1.

The tubular section 9b of the coupling member 2 has an enlarged outer end portion 15 which forms an internal annular shoulder 16 against which the outer end 17 of the tubular section 3b of the coupling member 1 abuts when the coupling members are coupled with the enlarged end portion 15 surrounding the portion 18 of the tubular section 3b as shown in FIG. 1.

It is desired to employ metal sealing means in the coupling rather than conventional elastomer sealing means and for this purpose the end portions 15 and 18 of the coupling members 2 and 1, respectively, are formed to overlap and provide opposed circumferentially continuous surfaces S and T of considerable axial extent when the coupling members 1 and 2 are coupled whereby as here shown, a resilient metal sealing ring or band 19 may be mounted on one of the two coupling members to form a seal between the surfaces S and T.

The sealing ring or band 19 is circumferentially continuous and may be formed of comparatively thin, resilient metal such as stainless steel or any other metal having the characteristics of resisting impairment under such high and low temperature that may cause failure of elastomer sealing elements, as well as the characteristic of resisting damage or failure when exposed to certain fluids which may cause impairment or shorten the life of elastomer seals.

As here shown, the metal sealing band 19 is fixed at one end to the body 3 of the coupling member 1 and extends axially from its fixed end in circumferentially spaced and surrounding relation to the surface T of the portion 18 of the tubular section 3b, with its outer or free end portion disposed to having tensioned engagement with the surface S of the tubular portion 15 of the coupling member 2. At its outer or free end the sealing band is bent as at 19a to an inverted V shape to provide a rounded and radially projecting sealing ridge 19b circumferentially of the convex side of the ridge for tensioned sealing engagement with the surface S of the coupling member 2. Opposite the concave side of the V-shaped portion 19a is a recess 20 formed in the portion 18 of the section 3b and extending circumferentially thereof to form a chamber whereby fluid under pressure in the coupling will be effective to urge the sealing band 19 into sealing engagement with the surface S of the coupling member 2.

As a means for securing one end of the sealing band 19 to the body 3 of the coupling member 1, the sections 3a and 3b of the body 3 are provided with opposed annular shoulders 21 and 22 between which are clamped an annular flange 19c of the band 19 and an annular flange 23 forming a portion of locking means for releasably locking the coupling members in coupled relation. The flange 19c abuts the shoulder 22 and the flange 23 abuts the shoulder 21 as well as the flange 19c, the clamping of the flanges, taking place upon tightening the threaded connection of the tubular sections 3a and 3b of the coupling member 1. This clamping of the flange 19c provides a fluid tight seal at the fixed end of the sealing band 19.

The means for releasably locking the coupling members in coupled relation includes a circular series of resilient metal locking fingers 25 integral with the flange 23 and extending substantially at right angles thereto. These locking fingers are circumferentially spaced from the metal sealing band 19 to provide an annular space between the sealing band and the fingers 25 into which the enlarged tubular portion 15 of the coupling member 2 may be inserted in effecting a connection of the coupling members 1 and 2. At their outer ends the fingers 25 are enlarged to provide locking lugs 26 adapted to engage an annular locking shoulder 27 on the coupling member 2 to releasably lock the coupling members in coupled relation.

The outer end of the enlarged tubular portion 15 of the coupling member 2 is beveled as at 28 and 28' exteriorly and interiorly respectively, the exterior bevel 28 engaging and camming past the locking lugs 26 on the spring fingers 25 and urging said lugs radially outwardly when effecting a coupling of the two coupling members, whereby the locking lugs 26 will snap into locking engagement with the locking shoulder 27 upon completion of a coupling operation. The interior bevel 28' cams against the rounded sealing ridge 19b of the metal sealing band 19 and thereby enables the inner surface S of the member 15 of coupling member 2 to have sealing contact with the ridge 19b as soon as bevelled portion 28' passes the sealing ridge 19b, this sealing engagement continuing as the member 15 slides over the ridge 19b into position to complete the coupling operation.

An operating sleeve 30 surrounds the body 3 of the female coupling member 1 and is normally urged by a spring 31 into a position disposing an annular internal flange 32 on the outer end thereof in contact with the lugs 26 of the spring fingers 25 as shown in FIG. 2. With this arrangement, it is apparent that the sleeve 30 must be retracted to remove the flange 32 from contact with the locking lugs 26 and held in retracted position to permit the coupling members 1 and 2 to be coupled. When the end 17 of the coupling member 1 abuts the shoulder 16 of the coupling member 2, the locking lugs 26 will snap into locking engagement with the shoulder 27 of the coupling member 2 and the sleeve 30 is then released so that it will be moved by the spring 31 to dispose the flange 32 in overlying engagement with the locking lugs 26 thereby locking the spring fingers 25 against movement which would permit of uncoupling of the coupling members.

As a means for slidably maintaining the sleeve 30 on the coupling member 1, a back-up ring 34 for the spring 31 is seated in a recess 35 in the section 3a of the coupling member 1 and is disposed within one end portion of the bore of the sleeve 30, the spring 31 being confined between the back ring 34 and the annular flange 32. Snap rings 36 are seated in a groove 37 within the sleeve 30 so as to bear against the back-up ring 34 and limit movement of sleeve in direction in which the flange 32 is caused to engage the locking lugs 26. The back-up ring 34 abuts the flange 23 from which the spring fingers 25 extend and is thereby held in place in the recess 35.

The valves 4 and 10 in the coupling members 1 and 2 respectively are so positioned with relation to the ends of the portion 18 and 25 of the coupling members that the metal sealing band 19 will form a seal with the inner surface S of the coupling member 2 before the portions 4a and 10a of the valves abut one another to effect the unseating of the valves in the operation of coupling the coupling members. Likewise in uncoupling the coupling members 1 and 2 which is effected after retracting and holding retracted the sleeve 30, the valves 4 and 10 will seat before the surface S of the coupling member 2 moves out of sealing engagement with the sealing band 19 as the coupling members are being separated. Consequently, the sealing means positively prevents leakage at the coupling during the operations of coupling and uncoupling the coupling members.

It should be noted that the resilient metal sealing band 19 is inwardly offset from the outer ends of the spring fingers 25 and the outer end of the tubular section 3b and is thereby protected against being struck and damaged. The bevelled portion 28' on the coupling member 2 and the rounded sealing ridge 19b on the outer end of the sealing band 19 make it possible to move the end of the portion 15 of the coupling 2 past the ridge 19b into and from position to form the seal, without distorting or damaging the sealing band 19 during coupling and uncoupling movements of the coupling members.

An important feature of this coupling is the construction and arrangement of the sectional body 3 and the cooperative relation of the locking fingers 25, the flange 23 thereof and the metal sealing band 19 whose flange 19c is clamped together with flange 23 between the shoulders 21 and 22 of the threadedly coupled sections of the body 3. This combination of elements is novel and provides a rugged coupling unit of simple construction in which the aforementioned advantages are afforded by means of the resilient metal sealing band and the cooperative relation thereof with associated parts as here shown.

I claim:

1. In a coupling having tubular coupling members which when coupled to one another provide a bore extending axially therethrough for conducting fluid through the coupling; the improvement wherein an annular member is fixed to one of said coupling members; a plurality of resilient locking fingers integral with said annular member and extending therefrom axially of said coupling member in a circular series for encompassing a portion of the other coupling member, means on said fingers and said other coupling member cooperable to releasably lock said coupling member in coupled relation; a cylindrical and circumferentially continuous resilient metal sealing band having a base abutting said annular member and a sealing portion at the free end thereof; means securing the opposite end portion of said band to said one coupling member with the remainder of said band extending axially from said one coupling member for sealing engagement of said sealing portion with said other coupling member; said locking fingers surrounding and extending axially beyond the free end of said band; and means shiftable on said one coupling member between a position engaging and holding said locking fingers in locked engagement with said other coupling member and a position free of said engagement with said locking fingers.

2. A coupling comprising: a pair of mutually engageable coupling members having axial bores therethrough for passing fluid through the coupling; said coupling members having tubular portions which overlap upon the coupling of said coupling members; an annular member on one of said coupling members, a plurality of resilient locking fingers integral with said annular member and extending axially of said one coupling member to define with the tubular portion of said one coupling member an annular space for reception of the tubular portion of the other of said coupling members; a cylindrical and circumferentially continuous resilient metal sealing band having a base abutting said annular member and a sealing portion adjacent to the free end thereof carried by said one of said coupling members so as to be disposed in said annular space for tensioned sealing engagement of said sealing portion with said tubular portion of said other coupling member; and means on said coupling members cooperable with said locking fingers for operating the latter to releasably lock said coupling members in coupled relation.

3. A coupling comprising: a pair of mutually engageable coupling members having axial bores therethrough for passing fluid through the coupling; said coupling members having tubular portions which overlap upon the coupling of said coupling members; an annular member on one of said coupling members, a plurality of resilient locking fingers integral with said annular member and extending axially of said one coupling member to define with the tubular portion of said one coupling member an annular space for reception of the tubular portion of the other of said coupling members; a cylindrical and circumferentially continuous resilient metal sealing band having a base abutting said annular member and a sealing portion adjacent to the free end thereof carried by one of said coupling members so as to be disposed in said annular space for tensioned sealing engagement of said sealing portion with said tubular portion of said other coupling member; a locking element on said other coupling member; said locking fingers having locking lugs thereon arranged to have releasable locked engagement with said locking element; an actuating sleeve on said one coupling member movable between a first position for engaging and holding said fingers in locking position, and a releasing second position free from contact with said fingers, and spring means urging said sleeve to occupy said first position.

4. A coupling comprising: a pair of mutually engageable coupling members having axial bores therethrough for passing fluid through the coupling; said coupling members having tubular portions which overlap upon the coupling of said coupling members; locking means on one of said coupling members including an annular member and a plurality of resilient locking fingers joined to said annular member; means mounting said annular member on one of said one coupling members; said locking fingers extending axially of said tubular portion of said one coupling member in circumferentially spaced relation thereto to define therebetween an annular space for reception of said tubular portion of the other of said coupling members: a circumferentially continuous resilient metal sealing band means fixing one end portion of said band to said one coupling member in contact with said annular member with said band having a sealing portion adjacent to the free end thereof extending axially of said tubular portion of said one coupling member into said annular space and in circumferentially spaced relation to said one coupling member and with the sealing portion of said band disposed for tensioned sealing engagement with the inner surface of said tubular portion of said other coupling member; and means on said coupling members cooperable with said locking fingers for operating the latter to releasably lock said coupling members in coupled relation.

5. In a coupling having tubular coupling members which when coupled provide a bore extending axially therethrough for conducting fluid through the coupling, the improvement wherein one of said coupling members includes a pair of tubular sections threadedly coupled in coaxial relation; the other of said coupling members having a tubular end portion adapted to encompass one of said sections when said coupling members are coupled; a cylindrical and circumferentially continuous resilient metal sealing band mounted so as to surround said one section; said band having a sealing ridge projecting radially outwardly at one end portion thereof for tensioned sealing engagement with the inner surface of said tubular end portion of said other coupling member; said threadedly connective sections having opposed annular clamping shoulders movable toward one another upon tightening the threaded connection between said sections; locking means carried by said one coupling member in surrounding and circumferentially spaced realtion to said one section and said band; a locking element on said other coupling member engageable with said locking means to releasably lock said coupling members in coupled relation; said locking means including an annular member clamped between said shoulders to hold said locking means in place; and said sealing band having the other end portion thereof clamped between said annular member and one of said annular shoulders to form thereat a seal and to support said band in surrounding relation to said one section.

6. In a coupling having tubular coupling members which when coupled provide a bore extending axially therethrough for conducting fluid through the coupling, the improvement wherein one of said coupling members includes a pair of tubular sections threadedly coupled in coaxial relation; the other of said coupling members having a tubular end portion adapted to encompass one of said sections when said coupling members are coupled; a cylindrical and circumferentially continuous resilient metal sealing band mounted so as to surround said one section with one end portion thereof disposed to have tensioned sealing engagement with the inner surface of said tubular end portion of said other coupling member; said threadedly connective sections having opposed annular clamping shoulders movable toward one another upon tightening the threaded connection between said sections; locking means carried by said one coupling member in surrounding and circumferentially spaced relation to said one section and said band; a locking element on said other coupling member engageable with said locking means to releasably lock said coupling members in coupled relation; said locking means including an annular member clamped between said shoulders to hold said locking means in place; and said sealing band having the other end portion thereof clamped between said annular member and one of said annular shoulders to form thereat a seal and to support said band in surrounding relation to said one section, and said locking means and said one section extending axially outwardly beyond said one end portion of said sealing band.

7. A coupling comprising: a pair of mutually engageable coupling members having axial bores therethrough for passing fluid through the coupling; said coupling members having tubular portions which overlap upon the coupling of said coupling members; an annular member on one of said coupling members, a plurality of resilient locking fingers joined to said annular member and extending axially of said one coupling member to define with the tubular portion of said one coupling member an annular space for reception of the tubular portion of the other of said coupling members; a cylindrical and circumferentially continuous sealing member having a base abutting said annular member and a sealing portion adjacent to the free end thereof carried by one of said coupling members so as to be disposed in said annular space for tensioned sealing engagement of said sealing portion with said tubular portion of said other coupling member; and means on said coupling members cooperable with said locking fingers for operating the latter to releasably lock said coupling members in coupled relation.

References Cited by the Examiner

UNITED STATES PATENTS

| | | | |
|---|---|---|---|
| 604,474 | 5/1898 | Jessup | 277—212 X |
| 1,933,117 | 10/1933 | Markle | 285—110 X |
| 2,457,052 | 12/1948 | LeClair | 137—614.04 |
| 2,723,721 | 11/1955 | Corsette | 277—212 X |
| 2,727,759 | 12/1955 | Elliott | 285—316 X |
| 2,860,893 | 11/1958 | Clark | 285—316 |
| 3,039,794 | 6/1962 | DeCenzo. | |

FOREIGN PATENTS

| | | |
|---|---|---|
| 291,319 | 4/1916 | Germany. |
| 657,381 | 9/1951 | Great Britain. |
| 686,387 | 1/1953 | Great Britain. |

M. CARY NELSON, *Primary Examiner.*

LAVERNE D. GEIGER, *Examiner.*